United States Patent [19]
Berstein

[11] 3,988,522
[45] Oct. 26, 1976

[54] PAPER COATED WITH ORGANIC PIGMENT-CONTAINING COATING COLORS

[75] Inventor: Gregor Berstein, Newton, Mass.

[73] Assignee: Cabot Corporation, Boston, Mass.

[22] Filed: Nov. 24, 1975

[21] Appl. No.: 634,922

Related U.S. Application Data

[60] Division of Ser. No. 514,090, Oct. 11, 1974, Pat. No. 3,953,421, which is a continuation-in-part of Ser. No. 324,338, Jan. 17, 1973, abandoned, which is a continuation-in-part of Ser. No. 168,467, Aug. 2, 1971, abandoned, which is a continuation-in-part of Ser. No. 59,731, July 3, 1970, abandoned.

[52] U.S. Cl. .................................. 428/323; 260/6; 260/17.3; 260/852; 428/530
[51] Int. Cl.² .................. B32B 5/16; C08L 3/02
[58] Field of Search ............ 428/530, 323; 260/6, 260/17.3, 851, 852; 106/137

[56] References Cited
UNITED STATES PATENTS

| | | | |
|---|---|---|---|
| 3,714,085 | 1/1973 | Berstein et al. | 260/39 SB |
| 3,850,868 | 11/1974 | Wismer | 260/29.3 |
| 3,943,080 | 3/1976 | Wismer et al. | 260/15 |

*Primary Examiner*—Edward M. Woodberry
*Attorney, Agent, or Firm*—Jack Schuman; Lawrence A. Chaletsky; Barry R. Blaker

[57] ABSTRACT

Improved aqueous slurry type coating colors for coating of paper, paperboard and the like are described in which there is incorporated along with the usual finely divided inorganic pigments, such as clay, an auxiliary pigment consisting of a substantially water-insoluble, cross-linked urea-formaldehyde resin in highly dispersed particulate form. The urea-formaldehyde pigment constitutes from about 2 to 25% and preferably from about 3 to about 15% by weight of the total pigment solids in the coating colors. The BET specific surface area of the particulate urea-formaldehyde pigments ranges from about 40 to about 75 square meters per gram in which instance the average agglomerate size of the pigments ranges from about 2 to about 3.5 microns. In those instances where the BET specific surface area of the urea-formaldehyde pigments ranges from at least 15 to 40 square meters per gram, the average agglomerate size of the pigments ranges from about 2 to about 4 microns.

10 Claims, No Drawings

PAPER COATED WITH ORGANIC PIGMENT-CONTAINING COATING COLORS

This is a division of application Ser. No. 514,090, filed Oct. 11, 1974, now U.S. Pat. No. 3,953,421 which is a continuation-in-part of U.S. Application Ser. No. 324,338, filed Jan. 17, 1973, and now abandoned, which in turn is a continuation-in-part of U.S. Application Ser. No. 168,467, filed Aug. 2, 1971 and now abandoned, which in turn is a continuation-in-part of U.S. Application Ser. No. 59,731, filed July 3, 1970, and now abandoned.

This invention pertains to the art of coating papers and particularly to solid pigment containing liquid slurry compositions useful in coating papers or paperboard, such compositions being normally referred to in commercial practice as "coating colors". Also included within the scope of this invention are certain urea-formaldehyde pigments especially suited for use in such "coating colors" as well as the improved coated paper products obtained by applying the novel coating compositions provided herein to suitable paper stocks and finishing same in the usual manner.

Although there are a host of different specialty papers and paperboards that are coated for a wide variety of specific purposes, the principal fields of present interest encompass the production of stocks for the publication and packaging industries. While improvements in opaqueness, brightness and similar criteria as to appearance of the basic paper product are commonly sought throughout most of the paper-coating industry, more functional performance parameters such as printability can never be neglected in products intended for the publishing field, as well as in many packaging applications.

In recent years special emphasis has been placed by the publishing industry upon achieving, with regard to both appearance and performance, top quality papers having the minimum possible weight per ream owing both to consumer preferences and to the need for economics in the face of the rapidly increasing costs of handling, shipping and mailing of books, magazines and the like. Although steady progress has been made in this direction, additional improvements are still needed and are actively being sought. For example, advances in paper making materials, machines and methods have already permitted the basis weight (uncoated stock) of good quality magazine papers to drop from a figure of close to 40 pounds per ream down to below 30 pounds per ream. However, the most efficient current coating practices add about 10 pounds per ream to such papers (coated on both sides) bringing the finished paper weight close to 40 pounds per ream.

Accodingly, it is a principal object of this invention to provide improved coating colors for a variety of papers, especially for use in printing and publishing.

Another object is to provide paper coatings and coated papers which on a weight basis provide superior appearance in terms of properties such as opacity and brightness without diminishing printing properties.

Another object is to provide improved coating colors for printing papers which colors are effective at a lower total coating weight per unit or area and thereby permit the production of publication coated papers which are lighter in finished weight.

Another object is to provide certain urea-formaldehyde pigments especially suited for use in such coating colors.

Other objects will be obvious or become apparent from the following description and discussion.

In accordance with the present invention, paper coatings of improved brightness, optical efficiency or overall performance, especially when used in making publication-type papers are provided by using as a minor pigment component thereof certain water-insoluble, finely divided particulate urea-formaldehyde resins. These pigments are essentially non-porous and infusible as a result of their highly cross-linked structure. They are not to be confused with ordinary, fusible and soluble urea-formaldehyde resins which have previously been used as binder additives, adhesives, etcetera. Indeed, these highly cross-linked ureaformaldehyde pigments of the present invention do not in any sense reduce or replace the binder ingredients needed in the coating color composition but should be considered as replacing a minor proportion of the conventional inorganic pigments employed.

Generally, the cross-linked urea-formaldehyde pigments should constitute from about 2 to about 25% and preferably from about 3 to about 15% by weight of the total pigment solids used in the coating. The balance of the pigment solids should then be composed of the conventional inorganic pigments used in paper coatings such as clays, talc, titania, alumina, barium sulfate, calcium carbonate or whiting, satin white, calcium sulfate, zinc oxide, silicas, etcetera. However, fine kaolin clays (preferably not over about 2 microns in mean particle size) have become by far the most widely used pigments in paper coatings. Especially in the publication field, such coating grade clays often comprise substantially all or all but a very minor proportion of the total pigment solids in the coating color formulation commonly used. Fortunately, the advantages of using the cross-linked ureaformaldehyde pigments of this invention are outstanding in clay based systems.

Being essentially inert, the cross-linked, ureaformaldehyde pigments used as supplement paper coating pigments in accordance with the present invention have been found to be compatible not only with the primary inorganic pigments conventially used therein, but also with the important adhesive binder systems as well as the various minor additives normally used in coating colors for paper. Thus, in the present invention any of the very popular modified or converted starch systems can be used such as oxidized, hydrolyzed, hydroxyethylated, etcetera. In addition to the various grades and types of starch, other polymeric binder systems can be used alone or in combinations (with starches or with each other) such as caseins, soya protein, polyvinyl alcohol, and many different latex types such as polyvinyl acetate, styrene butadiene copolymers and various acrylic type polymers.

Furthermore, the standard addivites that are useful in conventional coating colors based on clay and other inorganic pigments are still useful in the coating colors of the present invention based on pigment mixtures composed in the majority of inorganic pigments together with a minor complement of certain cross-linked urea-formaldehyde pigments. For example, there may be used such miscellaneous minor additives as dispersing agents, wetting agents or other surface active agents, viscosity regulators, defoamers, lubricants, plasticizers, preservatives, etcetera.

In preparing the coating colors of this invention, the methods already accepted and presently practiced in the industry may be used. Generally, the methods followed involve first preparing an aqueous solution or colloidal dispersion of the binder. In many cases, especially with starches, heating or cooking in the aqueous medium is often helpful in accelerating the complete solution thereof. The pigments may be added to and dispersed throughout the aqueous binder medium either before or after the binder has been thoroughly dissolved. Often, the inorganic pigments are prewetted and predispersed as a concentrated aqueous slurry before being added to the binder medium but this is more a matter of convenience than of necessity. In any case, the cross-linked urea-formaldehyde pigment used as the auxiliary pigment can readily be added at almost any stage of the mixing processes outlined above. For example, it can be dispersed into either the binder medium or a predispersed slurry of the inorganic pigment before they are combined; or it could be incorporated into the admixture of the two after their combination. In other words, it might prove most convenient to incorporate the pigments near the end of the mixing processes along with any remaining miscellaneous additives desired or needed to produce a finished, smooth, uniform slurry of the desired consistency. Although the urea-formaldehyde pigments are of very low bulk density, they are not difficult to handle and the exact manner of handling and incorporating them into the coating colors in actual practice is subject to wide variations.

Turning now to the cross-linked pigments used as auxiliary pigments in the present invention, a more detailed description of the chemical and physical nature of these essentially non-porous and infusible, finely divided, urea-formaldehyde pigments together with preferred methods of preparing same follows.

The molar ratio of urea to formaldehyde chemically combined in the structure of these pigments ranges from about 1:1.3 to about 1:1.8. Additionally, the internal structure of these pigments is highly cross-linked, rendering them essentially infusible and insoluble in water and thus quite different from ordinary fusible and/or water soluble urea-formaldehyde condensation polymers. Although the cross-linked pigments of this invention have been washed with water in order to remove water soluble salts or other by-products, they normally contain a minor amount of volatile matter (i.e., matter susceptible of removal by subjecting the solid pigments to a temperature of about 135° C for two hours in a drying oven). This volatile matter is of no real moment in the present invention as long as it does not exceed about 15% of the weight of the pigments. In addition, these pigments should have in one instance a BET specific surface area ranging from about 40 to about 75 square meters per gram and an average agglomerate size of between about 2 and about 3.5 microns. Alternatively, the pigments have a BET surface area of at least 15 to 40 m²g and an average agglomerate size of from about 2 to about 4 microns.

The urea-formaldehyde pigments of the present invention are readily prepared by reacting formaldehyde with urea in suitable proportions in aqueous solution under proper conditions. As previously indicated, the molar proportions of urea to formaldehyde range from about 1:1.3 to about 1:1.8. In addition, the amount of water in the reaction solution should never be substantially less than the total weight of the organic reactants therein and, during the actual formation and precipitation of the highly cross-linked, insoluble pigments, should always be in substantial excess of the total weight of all of the other components of the reaction mixture. Suitable reaction temperatures are generally in the range of from about room temperature up to about 100° C, with the range from about 40° C up to about 85° C usually being most practical. Stirring or other intermixing activity in the aqueous reaction medium is advisable, especially during the later states of reaction when the insoluble, cross-linked pigments are being formed.

One of the most important conditions inherent in successfully preparing infusible and insoluble urea-formaldehyde pigments of the quality required to serve as the auxiliary pigment of the present invention is the use of a suitable cross-linking catalyst. As is known in the art, the best catalysts for this purpose are relatively strong inorganic and/or organic acids such as sulfuric, phosphoric, sulfamic, or chloro-acetic acids, etcetera. In general, this acid curing or cross-linking catalyst should have an ionization constant greater than $10^{-4}$. However, the most preferred catalysts utilized for making products as described herein are sulfamic acid and-/or water-soluble ammonium acid sulfate salts, such as ordinary ammonium bisulfate and certain organic derivatives of same wherein a simple, essentially hydrocarbon type radical, such as a methyl group, replaces one of the hydrogen atoms in said "ammonium" structure. While the catalyst can be present in the reaction medium from the beginning, it is preferred to conduct the urea-formaldehyde pigment formation reaction in two stages. In the first stage the urea and formaldehyde are allowed to react normally in accordance with the conventional condensation mechanism, forming a low molecular weight, water-soluble precondensate and then in a second state the curing catalyst is introduced to promote faster reaction and cross-linking wih formation of the insoluble pigment. Conveniently, the intensity of mixing in the reaction medium is increased sharply when the catalyst is introduced in order to minimize continuous gel formation and promote the formation of more highly dispersed particulate solid aggregates.

Regardless of whether the catalyst is present throughout the reaction or admitted only in the latter stage thereof, the final insoluble pigment will ultimately be recovered from the aqueous liquid by conventional techniques including one or more of such operations as filtration, centrifugation, and drying. Various drying techniques can be employed, such as spray drying, forced air drying, azeotropic distillation, convection drying, etcetera. Although basically of finely particulate character, the pigment will naturally be more or less agglomerated into secondary aggregates or gel-like granules. Therefore, it will usually be desirable to subject the pigment to some form of comminuting or deagglomerating action in order to realize its full potential as an auxiliary pigment in the present invention. For this purpose the pigment can be subjected to various disintegrating, attrition or impact-type milling operations including such things as ball milling, pin milling, high fluid energy jet milling or high-speed rotary disc mills, etcetera. This disintegrating action must be sufficient to reduce the average agglomerate size to the required size ranging from about 2 to about 4 microns.

In an optional but strongly preferred embodiment of the present invention, water-soluble macromolecular organic substances which tend to increase the viscosity of aqueous solution, referred to hereinafter as protective colloids, are added to the reaction mass either before or after the formation of the water-soluble urea-formaldehyde precondensate. Typical examples of such protective colloids are natural substances such as starch, gelatin, glue, tragacanth, agar agar and gum arabic; modified natural substances such as carboxymethylcellulose, the alkali metal salts of carboxymethylcellulose, particularly the sodium salt of carboxymethylcellulose, methylcellulose, ethylcellulose, betahydroxyethylcellulose, alkali metal alginates, and the like, synthetic polymers such as polyvinyl alcohol, polyvinyl pyrrolidone, watersoluble polymers and copolymers of acrylic or methacrylic acids and alkali metal salts thereof, salts of maleic acid-containing copolymers, styrene-maleic anhydride copolymers, polyhydrochlorides of homopolymers and copolymers of vinylpyridine and the like. The amounts of protective colloids to be employed are dependent on the type, chemical structure and molecular weight thereof. However, the protective colloids are generally used in amounts ranging from about 0.1 to about 5 percent by weight based on the weight of the urea and formaldehyde reactants in order to promote more finely divided, highly particulate end products. Preferably, amounts of the protective colloid ranging from about 0.5 to about 3 percent by weight based on the weight of the urea and formaldehyde reactants are used. In practice, the protective colloid may be added at any stage during the formation of the urea-formaldehyde pigments prior to the point at which the ureaformaldehyde precondensate is formed into a gel or precipitate.

More particularly, the optimum procedure for preparing the urea-formaldehyde pigments of this invention entails the use of sulfamic acid or a water-soluble ammonium hydrogen sulfate as hereinabove defined as a curing catalyst, optionally in combination with a protective colloid, in the conversion of a precondensate of urea and formaldehyde into the cross-linked gel. In more detail, a precondensate of urea and formaldehyde having a molar ratio of from about 1:1.3 to about 1:1.8 of urea to formaldehyde is formed at a temperature varying from room temperature to about 100° C and at a pH range of from about 6 to about 9 and for a period of time sufficient to permit the greater portion of the formaldehyde to be reacted with the urea. When utilized, the protective colloid, such as the sodium salt of carboxymethylcellulose, is added to the precondensate at any time during the production thereof, or is added separately as a solution to an initially prepared precondensate. To the resultant precondensate there is then added, with agitation, a solution of sulfamic acid or a water-soluble ammonium hydrogen sulfate at a temperature ranging from room temperature to about 100° C until a cross-linked gel is formed. the gel is subsequently comminuted by suitable means such as a cutter-granulator or the like. The resultant reaction product, which is a solid, infusible and insoluble urea-formaldehyde pigment, is neutralized with an aqueous solution of a base. Thereafter the slurry is dewatered by filtration or centrifugation, dried by a conventional technique such as air drying and then deagglomerated by means of such devices as a pin mill, an impact mill or an air jet mill. The progress and effectiveness of such deagglomeration treatments can readily be followed by measuring such properties as the pour density and/or the oil (or other liquid) absorption value of the pigment before and after it is passed through the milling device employed. Generally, significant reductions in average agglomerate size as well as in the oil or other liquid absorption values are effected in such treatments. It is absolutely essential, however, that the average agglomerate size of pigments having BET specific surface areas of from about 40 to about 75 $m^2/g$, following deagglomeration, be from bout 2 to about 3.5 microns when measured by the Coulter Counter under conditions described in the following summary. Where the pigments have BET surface ares of at least 15 to 40 $m^2g$, it is required that the average agglomerate size of the pigments, following deagglomeration, be from about 2 to about 4 microns.

A satisfactory rating of the state of agglomeration of the cross-linked urea-formaldehyde pigments can be made by using the Coulter Counter. This instrument registers the changes in electrical resistivity of an electrolyte solution in which a very low concentration of inert solid particles has been thoroughly suspended as the suspension flows through a small aperture between two electrodes. In the present case, 0.2 milligram of the pigment is ultrasonically dispersed in 150 milliliters of an aqueous solution containing 2% by weight sodium chloride for 4 minutes at an instrument setting of 8 using a Model W-185D Sonifier manufactured by Heat Systems-Ultrasonics, Inc. of Plainview, New York, United States of America. The electrical impulses are analyzed by the Coulter Counter using a 50 micron aperture on the assumption that the change in electrical resistivity is proportional to the volumes of the individual particles passing through the aperture. From these data, a mean agglomerate size, that is the 50 percent weight average, is determined and reported.

The capacity of the urea-formaldehyde pigment for absorbing liquids is rated by running a "wetting out" test similar to the standard oil absorption test of ASTM except that the liquid used is an aqueous solution of approximately 8% starch by weight instead of oil.

As previously indicated hereinabove, the principal pigment content of the coating colors of this invention in terms of relative amounts will be composed of conventional inorganic pigments such as the well-known coating clays. The particulate cross-linked urea-formaldehyde pigment will then be included only as an auxiliary pigment comprising a minor proportion of the total pigment solids by weight but sufficient to effect a significant improvement in the brightness or optical efficiency thereof. For the best combinations of such inorganic coating pigments with the cross-linked urea-formaldehyde pigments of the character described herein, significant improvements in brightness or optical efficiency can be detected at concentrations of said auxiliary pigment as low as about 2% by weight of total pigment content. Considering the optimization of both optical efficiency and the overall performance of the coating colors and the finished coated paper, the range of concentrations of primary interest will usually run from about 2 to about 25%, and preferably from about 3 to about 15%, of the crosslinked particulate urea-formaldehyde pigment based upon the total weight of pigment solids employed in the coatings.

In practicing the present invention, the cross-linked particulate pigments can be incorporated into the coating color formulations at almost any stage of the various mixing operations normally used in preparing same, as previously pointed out. However, if other dry ingredients are also being handled, it will usually be most convenient to incorporate the urea-formaldehyde pigments at the same stage of the mixing process as the other dry ingredients.

In order to provide a fuller understanding of the present invention and preferred practical embodiments thereof, the following non-limiting, illustrative working examples are given.

EXAMPLE A

Procedure for Preparing Cross-Linked Urea-Formaldehyde Pigment

To serve as a protective colloid, 31.5 grams of the sodium salt of a high molecular weight carboxymethylcellulose was dissolved in 157.5 grams of deionized water in a glass reaction vessel equipped with temperature control means and a variable speed agitator. Then, 2250 grams of an aqueous formaldehyde solution containing 30% formaldehyde by weight are introduced, and the contents of the vessel are heated to about 70° C. After adjusting the pH of the resulting solution to about 7.0 by adding a little dilute caustic soda solution, 900 grams of urea were added while stirring to dissolve same. Mild agitation is continued for 3 hours while maintaining the temperature of the vessel at about 70° C.

Next, the temperature of the vessel and contents is reduced to about 50° C. Then, a solution of 48.5 grams of sulfamic acid in 1575 grams of water, also at 50° C, is added rapidly with vigorous, high-speed stirring. A moderately exothermic reaction ensues which rapidly raises the temperature of the reaction vessel contents to about 65° C with the simultaneous formation of a voluminous precipitate of insoluble pigment throughout the reaction mixture. The resultant gel-like matrix is allowed to cure for about 3 hours while holding the temperature at about 65° C and is then comminuted to granular agglomerates of about 1 to 2 millimeters maximum size.

The granulated product is then slurried into about 5000 cc. of water by stirring and the pH of the resultant slurry adjusted to about 7.5 with dilute sodium carbonate solution. The slurry is then filtered and the solid filter cake is washed with fresh water and dried in a current of hot air (about 100° C). After cooling to about room temperature, the dry solid product is partly deagglomerated by passing same at a feed rate of about 200 grams per minute through a pin mill (a KOLLO-PLEX 160Z mill made by Alpine Aktiengesellschaft of Augsburg, Germany) operated at a rotational speed of about 20,000 rpm. From the outlet of this pin mill, there is collected a total of 1170 grams of fine, bright, infusible, urea-formaldehyde pigment having a BET specific surface area of about 53 square meters per gram, a true specific gravity of about 1.4 and a volatile content of about 10% by weight (determined by heating a sample for 2 hours at 135° C and 0.01 mm. of Hg). The mean agglomerate size was about 4.5 microns as determined by use of the Coulter Counter and the aqueous starch solution (containing 8.2% by weight of starch) absorption value was about 3.9 grams per gram of urea-formaldehyde pigment when the end point was determined in the same manner as in the standard oil absorption test (ASTM D-281-31). Half of the urea-formaldehyde pigment was set aside for experimental use and will hereinafter be identified as "Urea-Formaldehyde Pigment of Example A (P)".

The other half of the above urea-formaldehyde pigment is further deagglomerated by passing same at a feed rate of about 100 grams per minute through a fluid energy jet mill (a 4" MICRONIZER made by Sturtevant Corrporation of Boston, Massachusetts) operating with superheated steam fed at about 70 p.s.i.g. and 232° C. The surface area and other properties of this jet-milled urea-formaldehyde pigment all remained essentially unchanged except that the volatile content was reduced to about 8% by weight and the mean agglomerate size as measured by the Coulter Counter method was reduced to about 2.2 microns. This jet-milled urea-formaldehyde pigment will hereinafter be identified as "Urea-Formaldehyde Pigment of Example A (M)".

EXAMPLE B

Alternative Procedure for Preparing Cross-Linked Urea-Formaldehyde Pigment

Example A was repeated step for step except that no protective colloid was included in the aqueous reaction medium and no jet-milling step was employed following the pin-milling step at the end of the operation. As a result, there was produced 136 grams of a fine, white, infusible resin powder having a BET specific surface area of about 26 square meters per gram, a true specific gravity of about 1.42 and a volatile content of about 10% by weight. The mean agglomerate size by the Coulter Counter method was 4.9 microns in this case while the aqueous starch solution absorbed was 6.4 grams per gram.

EXAMPLES C THROUGH E

Example C is carried out in the same way as shown for Example B except that the pigment is pin-milled sufficiently to have a mean agglomerate size of 4.0 microns. In the case of Example D, the procedure is the same as that for Example B except that the pigment is twice pin-milled with the result that the mean agglomerate size is 2.9 microns. With regard to Example E, the procedure of Example B is followed except for jet-milling the pigment to a mean agglomerate size of 2.3 microns.

EXAMPLE 1

Use of Cross-Linked Urea-Formaldehyde "Pigment of Example A (M)" as Paper Coating Pigment In this example a comparison is made involving a conventional clay-oxidized starch paper coating formulation and a paper coating formulation containing the same oxidized starch but in lieu of all clay, containing as a pigment a combination of clay and the higher surface area urea-formaldehyde pigment of the present invention. In particular, in this example the pigment consists of 93% by weight of clay and 7% by weight of the urea-formaldehyde pigment designated herein as "Pigment of Example A (M)". Furthermore, in order for the comparison to be more significant, each of the paper coatings are required to have a surface strength exceeding the pull of Dennison Wax No. 7.

An aqueous starch binder medium was prepared by wetting out 20 parts by weight of STAYCO-M, Staley Company's brand of oxidized corn starch, in 80 parts of water and heating the resulting mixture to a temperature of about 190° to 200° F for twenty minutes in order to effect substantially complete solution.

The above binder medium was then used to prepare several different batches of clay coating colors by dispersing therein varying amounts of LAMINA brand of mechanically delaminated kaolin clay, a commercial grade of paper coating clay sold by Engelhard Minerals and Chemicals Corporation. The amounts of LAMINA clay used in these batches was varied between 100 and 133 parts by weight per 100 parts of the above starch solution, thus providing a range of binder to pigment ratios running between 20 and 15 parts by weight of dry binder solids per 100 parts of pigment. Each coating color slurry was completed by the addition of the same minor additives to each together with sufficient additional water to bring the final slurry to a pH of about 7.5 and a viscosity appropriate for application to paper by means of a laboratory trailing blade coater. Final solids content was generally about 55% (±5%) by weight.

In a similar manner, the same binder medium described above was used to prepare a series of coating color batches in each of which the pigment consisted of 93% by weight of said LAMINA clay and 7% by weight of the cross-linked "Pigment of Example A (M)" above. The total pigment dispersed in these batches was varied from a minimum of 74.4 parts clay and 5.6 parts of Pigment A (M) to maximum of 123.7 parts clay plus 9.3 parts pigment so as to cover a weight range of between 25 and 15 parts of dry binder solids per 100 parts of total pigment. Also, as before, each blended pigment slurry was finished by the addition of the usual minor additives together with sufficient water to bring the final slurry to a pH of about 7.5 and a good viscosity for application to paper using the laboratory trailing blade coater.

Each of the coating colors from the above two series was applied to a standard test specimen of light-weight, publication grade cellulose fiber paper with a basis weight of 24 pounds per ream (3300 square feet). These coatings were carefully applied (using said laboratory trailing blade coater) at a uniform thickness designed in each case to provide a finished coating weight (after drying and reconditioning at 25° C and 50% relative humidity) of close to 4 pounds per side per ream. After drying and reconditioning, the coated test sheets were supercalendered between steel and cotton rolls at 150° F using nip pressure of 1400 pounds per linear inch of roll width and 3 nips for each coated side.

Upon checking the surface strengths of these various coatings on the felt side of the paper using TAPPI test RC-6, it was found that the two coating colors outlined in the following table were equivalent in this respect. (Both surface strengths exceeded the pull of Dennison Wax No. 7.)

TABLE 1

SOLIDS IN COATING COLORS

| | Sample Numbers | |
|---|---|---|
| | 14-2B | 13-1B |
| Clay content, parts by weight | 100 | 93 |
| Example A (M) Pigment, parts by weight | 0 | 7 |
| Oxidized Starch Binder, parts by weight | 17 | 22 |
| Weight % Solids in Aqueous Slurry | 58% | 52% |

Accordingly, the optical properties and performance parameters were determined for each of the above two coatings after application at 4 pounds finished weight per side per ream to both sides of standard test paper and supercalendering between steel and cotton rolls at 150° F using nip pressure of 1400 pounds per linear inch of roll width and 3 nips for each coated side.

The test methods used in assessing the optical properties of the coatings were as follows: TAPPI Standard Test T-480-ts-65 to measure 75° gloss of the coated papers; TAPPI Standard Test T-425-os-60, using a Bausch and Lomb Opacimeter, to measure reflectances of the standard uncoated paper over standard white and black backgrounds ($R_{P-W}$ and $R_{P-B}$) and of each coated sample over the same backgrounds ($R_{CP-W}$ and $R_{CP-B}$). From the latter measurements the opacity $R_{CP-B}/R_{CP-W}$ was calculated as a measure of the opacity of each coated sheet. Also, using both the coated and uncoated paper reflectance values, the well-known Kubelka-Munk theory and equations for light scattering were used to calculate the scattering power of the coatings per se. Thus, calculation procedures like those outlined by Harold B. Clark and Howard L. Ramsey in their presentation at the 16th Paper Coating Conference held at Portland, Oregon on May 9 through 13, 1965 (preprints of which have been published by TAPPI) were followed to estimate the specific scattering provided per pound of coating weight when uniformly distributed over a ream of paper. The brightness values of the coated sheets were determined with the Bausch and Lomb Opacimeter with the test paper backed by a pile of sheets as described in the Bausch and Lomb Reference Manual.

Finally, there is also included at the end of the Table 2 below the Sheffield Smoothness Values for the felt side of the coated papers as measured by TAPPI Test RC-360, and results as to printing performance of each type of coated paper when the felt side thereof was subjected to the K and N Ink Test (as described in TAPPI standard RC-19). It should be pointed out that all of the measured numerical values reported in the following table represent averages of repeat observations on several replicate samples of each coated paper. The results of these tests are reported in Table 2 hereinbelow.

TABLE 2

Comparison of Properties of Coated Papers (After Calendering)*

| | Coating Used on Paper | |
|---|---|---|
| Property Compound | 14-2B | 13-1B |
| 75° Gloss (% of standard) | 47 | 44 |
| B and L Reflectance Readings: | | |
| $R_{P-W}$ (uncoated paper/white) | .7317 | .7317 |
| $R_{P-B}$ (uncoated paper/black) | .5947 | .5947 |
| $R_{PC-W}$ (coated paper/white) | .7550 | .7568 |
| $R_{PC-B}$ (coated paper/black) | .6741 | .6796 |
| Opacity ($R_{PC-B}/R_{PC-W}$) | .893 | .898 |
| Brightness (% of standard) | 72.6 | 72.9 |
| $S_C$ (spec. scattering power of coating per pound per ream) | .1100 | .1200 |
| Smoothness (Sheffield Values) | 32 | 28 |
| K and N Ink Test: | | |
| (a) Staining or Ink absorption | ←---- equivalent ----→ | |
| (b) Visual rating of surface defects | ←---- equivalent ----→ | |

*Coatings adjusted to equal values for Dennison Wax Numbers.

Although the above data show only a slight improvement in brightness for test coating 13-1B (containing the combination pigment), a significant improvement in specific scattering power is still obtained. In the present example, the practical benefit shows up primarily in the increase in the opacity of the coated paper, which is very meaningful. It also indicates that only 3.5 pounds per side per ream of test coating 13-1B could be used to obtain equal opacity to 4 pounds per side per ream of the control coating 14-2B (containing the all-clay pigment), if one desired a coating of equal opacity, i.e., 0.893.

The 75° Gloss, Smoothness and Ink test results indicate that the printing performance of the two coated papers should be about the same. This indication was fully confirmed by making a direct comparison of full tone and 120 line half-tone prints on a Vandercook Proof press using Magenta-Heat Setting Ink.

The test coating 13-1B of the above example made with the 93-part clay to 7-part "Pigment of Example A (M)" combination was reformulated using Penford No. 280 starch, a hydroxyethylated starch sold by Penick and Ford Company, instead of the oxidized starch binder used initially. The equivalent coating (in terms of a surface strength better than Dennison Wax No. 7 in TAPPI test RC-6) contained 18 parts of binder solids per 100 parts of total pigment solids and about 50% total solids in the coating color slurry. Coated papers made from this alternative test coating in the manner described above and subjected to the same series of tests gave values substantially equal to those reported in Table 2 above for the papers coated with the original coating 13-1B. Analogous results are also obtained when other conventional finely divided inorganic pigments are used in place of the coating clay of the above example.

EXAMPLE 2

Comparison of Coating Colors Containing Respectively "Pigment of Example A (M)" and "Pigment of Example A (P)"

Using Penford No. 280 (hydroxyethylated starch) as the binder, coating colors were made up according to the proportions indicated in the following table.

TABLE 3

| Solids in Coating Colors | | | |
|---|---|---|---|
| | Sample Numbers | | |
| | 19-2A | 18-3A | 21-1 |
| LAMINA clay, parts by weight | 100 | 92 | 92 |
| Example A (M) Pigment, parts by weight | 0 | 8 | 0 |
| Example A (P) Pigment, parts by weight | 0 | 0 | 8 |
| Hydroxyethylated starch, parts by weight | 18.3 | 18.3 | 18.3 |
| Weight % Solids in Aqueous Slurry | 53% | 46% | 53% |

Standard Test paper with a basis weight of 24 pounds per ream was coated with each of the above coating colors, using 4 pounds (finished coating weight) per ream on each side. All three coated papers, after drying and reconditioning as in Example 1, were subjected to supercalendering at 150° F using 1200 pounds per lineal inch nip pressure between cotton and steel rolls and 2 nips per side.

The averaged results of the optical and performance parameters measured on these three papers are reported in Table 4 below, where the test methods used were the same as in Example 1, except that in the K and N Ink Test the staining or ink absorption was assessed by actually measuring the % Y (green) reflectance by means of a Color-Eye Instrument after the ink had been applied and wiped off in the usual way.

TABLE 4

| | Comparison of Coated Papers (After Supercalendering) | | |
|---|---|---|---|
| | Coatings Used on Paper | | |
| Property Compared | 19-2A | 18-3A | 21-1 |
| Dennison Wax No. (passed) | 8 | 7 | 9 |
| 75° Gloss (% of standard) | 46 | 40 | 46 |
| Bausch and Lomb Reflectance Readings: | | | |
|   $R_{p\text{-}w}$ (uncoated/white) | .7317 | .7317 | .7317 |
|   $R_{p\text{-}B}$ (uncoated/black) | .5947 | .5947 | .5947 |
|   $R_{pc\text{-}w}$ (coated/white) | .7545 | .7634 | .7541 |
|   $R_{pc\text{-}B}$ (coated/black) | .6684 | .6864 | .6689 |
| Opacity ($R_{pc\text{-}B}/R_{pc\text{-}w}$) | .886 | .899 | .887 |
| Brightness (% of standard) | 72.3 | 73.7 | 72.4 |
| $S_c$ (specific scattering power) | .0970 | .1260 | .0990 |
| Smoothness (Sheffield Values) | 33 | 35 | 35 |
| K and N Ink Test: | | | |
|   (a) Staining or ink absorption | 39 % | 34 % | 40 % |
|   (b) Visual rating of surface defects | ←--- all equivalent ---→ | | |

The above results demonstrate that the "Pigment of Example A (P)" imparts similar performance to a clay-based paper coating in most respects. A decisive improvement in opacity and specific scattering power is only contributed by using the "Pigment of Example A (M)" which had been more thoroughly deagglomerated. As in the previous example, the high increase in opacity shown by test coating 18-3A can also be utilized by lowering the coating weight to about 3 pounds per side and ream and equalizing approximately the opacity of the 4 pounds reference coating. Further, such tests using other higher surface area crosslinked urea-formaldehyde pigments varying in mean agglomerate size indicate that the pigments must have a mean agglomerate size of between about 2 and 3.5 microns in those instances where the specific surface area is between about 40 and about 75 square meters per gram as well as having an absorption capacity for aqueous starch solution of between about 2 and about 4.4 grams per gram in order to carry out the present invention.

EXAMPLE 3

Use of Cross-Linked Urea-Formaldehyde Pigment of Example B as Paper Coating Pigment As shown in Examples 1 and 2, an aqueous starch binder medium was prepared and two series of coating color batches were prepared. In the first, only LAMINA coating clay was used as the pigment thereby providing an all-clay coating color batch. In the second case, a series of coating color batches was prepared using a pigment combination consisting of 90% by weight of the same clay and 10% by weight of the urea-formaldehyde pigment of Example B which has a surface area of 26 m$^2$/g and a mean agglomerate size of 4.9 microns. In other words, the total pigment dispersed in these batches varied from a minimum of 90 parts clay + 10 parts pigment to maximum of 119.7 parts clay + 13.3 parts pigment so as to cover the same weight range of between 20 and 15 parts of dry binder solids per 100 parts of pigment as in the case of the all-clay coating color slurries. As in Example 1, test coatings were made from these various coating color batches on standard paper samples. The resulting coated samples were dried and finished by the same general process except that the calendering was carried out at 150° F using nip pressure of 830 pounds per linear inch of roll width and 2 nips for each coated side.

The surface strengths on the felt side of the paper of the finished, calendered coatings from the above two series were then measured using TAPPI Control Method RC-6. It was found that the coating made with 17 parts of starch binder per 100 parts by weight of the 9/1 blend of clay/urea-formaldehyde pigment just matched the surface strength of the coating containing 15 parts of starch binder per 100 parts by weight of all-clay pigment. (Both surface strengths exceeded the pull of Dennison Wax No. 5.) Therefore, these two coatings were chosen for direct comparison of optical properties and printing performance in order to assess the relative merits of the two pigment systems.

The binder-pigment solids make-up of these two coating colors is summarized in the following table.

TABLE 5

| Solids in Coating Colors | | |
|---|---|---|
| | Sample Numbers | |
| | 9-2B | 11-5B |
| Clay Content, parts by weight | 100 | 90 |
| Example B Pigment, parts by weight | 0 | 10 |
| Oxidized Starch Binder, parts by weight | 15 | 17 |
| Weight % Solids in Aqueous Slurry | 55 % | 52 % |

The optical properties and performance parameters were determined for each of the above two coatings and the results obtained are reported in Table 6. The test methods are those utilized in Example 1 except that in this instance the brightness of the coated sheets was determined in accordance with TAPPI standard test T-452 (at light wavelength of 457 millimicrons).

TABLE 6

| Comparison of Properties of Coated Papers (After Calendering) | | |
|---|---|---|
| | Coating Used on Paper | |
| Property Compared | 9-2B | 11-5B |
| 75 % Gloss (% of standard) | 31 | 30 |
| B and L Reflectance Values: | | |
| $R_{P-W}$ (uncoated over white) | .7243 | .7243 |
| $R_{P-B}$ (uncoated over black) | .6084 | .6084 |
| $R_{PC-W}$ (coated over white) | .7469 | .7667 |
| $R_{PC-B}$ (coated over black) | .6820 | .7007 |
| Contrast Ratio ($R_{PC-B}/R_{PC-W}$) | .913 | .914 |
| Brightness (% standard) | 70.2 | 71.6 |
| $S_c$ (spec. scattering power of coating per lb. per ream) | .1190 | .1313 |
| Smoothness (Sheffield Values) | 25 | 25 |
| K and N Ink Test: | | |
| (a) Staining or Ink Absorption | ←--- equivalent ---→ | |
| (b) Visual rating of surface defects | ←--- equivalent ---→ | |

A study of the above data indicates that the use of the pigment system composed of 9 parts of clay plus 1 part of the auxiliary pigment (having a surface area of 26 m$^2$/g and a mean agglomerate size of 4.9 microns) resulted in the production of an improved paper coating. However, the improvement was of only a minor nature in that while the auxiliary urea-formaldehyde pigment was utilized in an amount of 10% by weight, the paper coating containing such auxiliary pigment showed a scattering power only about 9% higher than that of the all-clay pigment-containing paper coating. Moreover, the contrast ratio, which is a measure of opacity, is essentially the same for both paper coatings in that an increase of 0.001 is quite probably within the experimental error of the procedure. There is an improvement in brightness but in all other respects, including the K and N ink holdout test, the two coated paper products were virtually equal in performance. In an attempt to provide pigments of this surface area, i.e., 26 m$^2$/g, having superior properties in paper coatings, pigments of the Example B type were prepared and subjected to a further degree of deagglomeration. These are the pigments of Examples C, D and E. In the following example the beneficial effect of the deagglomeration of the pigments is clearly shown.

EXAMPLE 4

Use of Urea-Formaldehyde Pigments of Examples C, D and E as Paper Coating Pigments Following the procedure of Example 1, coating color batches containing varying portions of hydroxyethylated starch to pigment were made in two series, first using only SPRAY SATIN number 1 grade coating clay (made and sold by Engelhard Mineral and Chemicals Corporation) as the pigment and secondly using a pigment combination consisting of 93 parts by weight of the same clay plus 7 parts by weight of each of the pigments of Examples C, D and E. The mean agglomerate sizes of the urea-formaldehyde pigments of Examples C, D and E, respectively, are 4.0 microns, 2.9 microns and 2.3 microns. As in Example 1, test coatings were made from these various coating color batches on standard paper samples. The resulting coated samples were dried and finished by the same general process except that the calendering was carried out at 145° F using 800 pounds per lineal inch nip pressure and 2 nips per side. Following application of each of the coatings below at 4 pounds finished weight per side per ream to both sides of the standard test paper, the optical properties and performance parameters were determined by the methods of Example 1.

TABLE 7

| Solids in Coating Colors and Comparison of Coated Papers (After Calendering) | | | | |
|---|---|---|---|---|
| Clay content, parts | 100 | 93 | 93 | 93 |
| U/F Pigment of Example C, parts | — | 7 | — | — |
| U/F Pigment of Example D, parts | — | — | 7 | — |

TABLE 7-continued

| Solids in Coating Colors and Comparison of Coated Papers (After Calendering) | | | | |
|---|---|---|---|---|
| U/F Pigment of Example E, parts | — | — | — | 7 |
| Hydroxyethylated Starch, parts | 15 | 17 | 17 | 17 |
| Weight % Solids in Aqueous Slurry | 53.4 | 53.4 | 53.4 | 53.4 |
| 75° Gloss (% of standard) | 52 | 49 | 47 | 51 |
| Opacity | 83.4 | 84.1 | 84.4 | 84.6 |
| Brightness (% of standard) | 66.3 | 67.3 | 67.8 | 67.9 |
| $S_c$ (specific scattering power of coating per pound per ream) | 0.070 | 0.079 | 0.083 | 0.085 |
| Relative Scattering Power, % | 100 | 113 | 120 | 122 |
| Smoothness (Sheffield Values) | 8 | 7 | 7 | 7 |
| K and N Ink Test: | | | | |
| (a) staining or ink absorption, % | 52 | 50 | 49 | 48 |
| (b) visual rating of surface defects | ←---- equivalent ----→ | | | |

A review of the above data clearly shows that the use of a urea-formaldehyde pigment having 26 m²/g as a paper coating pigment does provide significant improvements in specific scattering power when the pigment has been more thoroughly deagglomerated than in the case of the urea-formaldehyde pigment of Example B. Moreover, whereas the use of the pigment of Example B produced no increase in opacity, the use of each of the pigments of Examples C, D and E results in increased levels of opacity when compared to an all-clay control paper coating. Also, in the present example, the practical benefit of increased opacity again appears since it is possible to obtain equal opacity to a 4 pound per side per ream all clay-containing control coating by using at most a 3.5 pound per side per ream coating of any of the paper coatings of this example. This is, of course, desirable in any instance where the weight of coated paper is a significant factor. The results of the 75° Gloss test, the Smoothness test and the Ink test indicate that the printing performance of each of the coated papers should be similar. It is evident from the above data therefore that as the urea-formaldehyde pigment is further deagglomerated the performance of the otherwise same pigment is improved.

EXAMPLE 5

Comparison Between Using Coating Color Containing "Pigment of Example A (M)" as a Prime Coat and as a Full Coat Standard test paper with a basis weight of 24 pounds per ream was coated carefully using coatings 19-2A and 18-3A of Example 2 in the following three ways. First, coating 19-2A was applied to give a finished coated paper with 4 pounds (finished coating weight) per ream on each side; then coating 18-3A was applied in the same manner; and finally, each side of the paper was coated first with about 2.4 pounds per ream of 18-3A followed by a top coat of about 1.6 pounds per ream of 19-2A. All three coated papers, after drying and reconditioning, were subjected to supercalendering at 150° F using 1200 pounds per lineal inch nip pressure between cotton and steel rolls and 2 nips per side.

The averaged results of the optical and performance parameters measured on these three series of papers are reported in Table 8 below, where the test methods used were the same as in Example 2.

TABLE 8

Comparison of Coated Papers (After Supercalendering)

| Property Compared | Coatings Used on Paper | | |
|---|---|---|---|
| | 19-2A | 18-3A | 18-3A and 19-2A |
| Dennison Wax No. (passed) | 8 | 7 | 8 |
| 75° Gloss (% of standard) | 46 | 40 | 44 |
| Bausch and Lomb Reflectance Readings: | | | |
| $R_{P-W}$ (uncoated/white) | .7317 | .7317 | .7317 |
| $R_{P-B}$ (uncoated/black) | .5947 | .5947 | .5947 |
| $R_{PC-W}$ (coated/white) | .7545 | .7634 | .7557 |
| $R_{PC-B}$ (coated/black) | .6684 | .6864 | .6718 |
| Opacity ($R_{PC-B}/R_{PC-W}$) | .886 | .899 | .889 |
| Brightness (% of standard) | 72.3 | 73.7 | 72.5 |
| $S_c$ (specific scattering power) | .0970 | .1260 | .1030 |
| Smoothness (Sheffield Values) | 33 | 35 | 28 |
| K and N Ink Test: | | | |
| (a) Staining or Ink Absorption | 39 % | 34 % | 50 % |
| (b) Visual Rating of Surface Defects | ←---- equivalent ----→ | | fewer |

The above data shows that the coating containing the finely divided cross-linked urea-formaldehyde pigment as auxiliary pigment can be used with advantage as either a single uniform thickness coating or in a non-uniform multilayer coating on paper. Although the scattering power, opacity and brightness are all maximized in the single uniform coating, the above data indicates that a better balance can sometimes be obtained by using a heterogeneous multi-coat system in other performance parameters such as smoothness, as is shown by the significantly lower Sheffield values and printing as is evidenced by the significantly higher K and N stain resistance values.

The pigments of Examples C, D and E are also found to perform suitably in the preparation of non-uniform multilayer coatings on paper when utilized as shown in Example 5.

While this invention has been described in connection with certain preferred embodiments thereof, many additional variations and modifications thereof will be obvious to those skilled in the art. Accordingly, the scope of my invention is to be limited only by the following claims.

The embodiments of the invention in which an exclusive property or privilege is claimed are defined as follows:

1. Coated paper comprising a cellulose base paper layer coated on at least one side thereof with an adherent coating comprising a suitable polymeric binder dissolved or dispersed in an aqueous slurry of finely divided pigment solids, the principal proportion of which by weight are inorganic pigments of less than 2 microns in mean particle size, and which pigment solids, in an amount of from about 2 to about 25% by weight based upon the total weight of pigment solids employed in the coating color composition, are essentially water-insoluble, infusible, non-porous, cross-linked urea-formaldehyde pigments in a highly dispersed particulate form having a molar ratio of urea to formaldehyde ranging from about 1:1.3 to about 1:1.8, a BET specific surface area of from about 40 to about 75 square meters per gram, and a mean agglomerate size of from about 2 to about 3.5 microns.

2. Coated paper as defined in claim 1 wherein the adherent coating amounts to at least one pound finished weight per ream of base paper.

3. Coated paper as defined in claim 1 wherein the cellulose base paper has a basis weight of from about 18 to about 60 pounds per ream and the adherent coating amounts to at least two pounds finished weight per ream of base paper.

4. Coated paper as defined in claim 1 wherein a second coating of different composition is applied on top of the adherent coating.

5. Coated paper as defined in claim 4 wherein the second coating is substantially free of the cross-linked urea-formaldehyde pigment.

6. Coated paper comprising a cellulose base paper layer coated on at least one side thereof with an adherent coating comprising a suitable polymer binder dissolved or dispersed in an aqueous slurry of finely divided pigment solids, the principal proportion of which by weight are inorganic pigments of less than 2 microns in mean particle size, and which pigment solids, in an amount of from about 2 to about 25% by weight based upon the total weight of pigment solids employed in the coating color composition, are essentially water-insoluble, infusible, non-porous, cross-linked urea-formaldehyde pigments in a highly dispersed particulate form having a molar ratio of urea to formaldehyde ranging from about 1:1.3 to about 1:1.8, a BET specific surface area of from at least 15 to 40 square meters per gram, and a mean agglomerate size of from about 2 to about 4.0 microns.

7. Coated paper as defined in claim 6 wherein the adherent coating amounts to at least one pound finished weight per ream of base paper.

8. Coated paper as defined in claim 6 wherein the cellulose base paper has a basis weight of from about 18 to about 60 pounds per ream and the adherent coating amounts to at least two pounds finished weight per ream of base paper.

9. Coated paper as defined in claim 6 wherein a second coating of different composition is applied on top of the adherent coating.

10. Coated paper as defined in claim 9 wherein the second coating is substantially free of the cross-linked urea-formaldehyde pigment.

* * * * *